United States Patent Office 3,355,476
Patented Nov. 28, 1967

3,355,476
ORGANOSILICON COMPOUNDS MADE
FROM STYRENES
Alvin E. Bey and Donald R. Weyenberg, Midland, Mich.,
assignors to Dow Corning Corporation, Midland, Mich.,
a corporation of Michigan
No Drawing. Filed Aug. 5, 1964, Ser. No. 387,773
6 Claims. (Cl. 260—448.2)

This application relates to new organosilicon compounds which are adducts to styrene and related compounds.

The reaction of styrene with alkyl lithium compounds is known, as is the reaction of halosilanes with alkyl lithium compounds.

The discovery of this invention is that a unique reaction occurs when the above three compounds are brought together under proper conditions to form new compounds which are useful as solvents and chemical intermediates.

This application relates to the process of making a compound of the formula

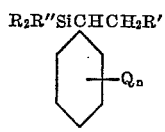

comprising reacting at a temperature of —15 to +35° C., in the presence of an inert solvent which is essentially free of active hydrogen, (a) one molar part of a compound of the formula R'Li, (b) from 1 to 10 molar parts of a compound of the formula $R_2R''SiX$, and (c) from 0.5 to 10 molar parts of a compound of the formula

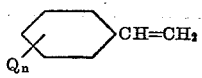

ingredient (a) being added to the mixture last, where R is a nontertiary alkyl radical of no more than six carbon atoms, R' is an alkyl radical of more than 1 carbon atom, R" is selected from the group consisting of nontertiary alkyl radicals of no more than 6 carbon atoms and aryl radicals, Q is an alkyl radical of no more than 6 carbon atoms, n is an integer of 0 to 2, and X is a halogen atom.

R can be any nontertiary (i.e. primary and secondary) alkyl radical of no more than six carbon atoms such as methyl, ethyl, isopropyl, sec-butyl or hexyl.

R' can be any alkyl radical of more than one carbon atom such as ethyl, isopropyl, t-butyl, hexyl, 2-ethylhexyl, dodecyl, or octadecyl.

R" can be any nontertiary alkyl radical of no more than six carbon atoms such as the radicals listed as examples of R. R" can also be any aryl radical such as the phenyl, tolyl, benzyl, naphthyl, or biphenyl radical.

Q can be any alkyl radical of no more than 6 carbon atoms such as methyl, ethyl, isopropyl, t-butyl, or sec-hexyl.

X can be any halogen atom, e.g. fluorine, chlorine, bromine, or iodine.

R and R" must be nontertiary because of steric considerations which can accelerate an undesirable side reaction to dominant proportions.

Any solvent that is essentially free of active hydrogen and is otherwise nonreactive toward the ingredients and products of this application is suitable for use. The term "inert" is used in the claims to express this nonreactivity. An "active hydrogen" is one that is bonded to a nitrogen, oxygen, sulfur, or phosphorus atom.

Examples of suitable solvents are tetrahydrofuran, diethylether, hexane, cyclohexane, decane, benzene, toluene, and xylene.

Preferred solvents are hydrocarbon ethers and hydrocarbons of low viscosity (i.e. less than 10 cs. at 25° C.).

It is desirable for sufficient solvent to be present so that the reaction mixture is fluid throughout the reaction, but the amount of solvent present is not critical.

Ingredient (a) must be added last because it can react with either ingredient (b) or (c) alone. Therefore a mixture of ingredients (b) and (c) must be present to minimize such side reactions.

The reaction is exothermic, and the alkyl lithium catalyst is unstable at temperatures greatly above room temperature; therefore it is desirable to run the reaction at room temperature or below (i.e. below 25° C.). At temperatures below —5° C., the reaction becomes undesirably sluggish. Therefore the preferred temperature range is from —5 to 25° C.

The products of this invention are useful as solvents, and as intermediates for the preparation of beta-substituted ethylbenzenes. Many beta-substituted ethylbenzenes, for example

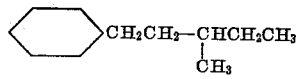

are very difficult to synthesize by previously-known methods.

Simple hydrolysis of the Si-C bond of the products of this invention, which is a well-known process, gives beta-substituted ethylbenzenes as shown by the following formula:

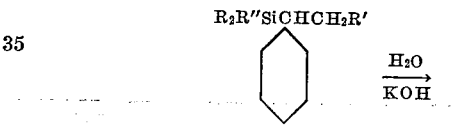

and alcohol

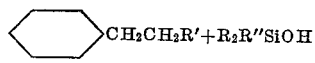

The following examples are illustrative only and should not be construed as limiting the invention which is properly delineated in the appended claims.

Example 1

A mixture of 41.7 g. (0.4 mole) of styrene, 43.5 g. (0.4 mole) of trimethylchlorosilane, and 200 ml. of tetrahydrofuran was placed in a flask. A solution of 0.2 mole of n-butyllithium in 129 ml. of hexane was added dropwise to the mixture. The reaction temperature ranged from 5 to 15° C. with external cooling.

The reaction mixture was stirred at room temperature overnight, and from the reaction mixture there was recovered 14.3 g. (0.061 mole) of

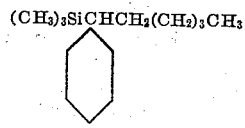

B.P. 142° C. at 121 mm. pressure.

Other products that were recovered were n-butyl-trimethylsilane and unreacted styrene.

Example 2

The experiment of Example 1 was repeated, using diethylether rather than tetrahydrofuran, and maintaining the reaction temperature between 10 and 15° C.

There was recovered 22.8 g. (0.097 mole) of 1-phenylhexyltrimethylsilane.

Example 3

The experiment of Example 1 was repeated, using hexane rather than tetrahydrofuran. The reaction mixture was stirred at room temperature for 1½ days.

There was recovered 19.3 g. (0.082 mole) of 1-phenylhexyltrimethylsilane.

Example 4

The experiment of Example 1 was repeated, using 0.4 mole of trimethylfluorosilane in place of the trimethylchlorosilane, and running the reaction at a temperature of 5 to 10° C.

The reaction mixture was stirred at room temperature for 1 hour.

5.4 grams of 1-phenylhexyltrimethylsilane were recovered.

Example 5

The experiment of Example 1 was repeated using a solution of 0.2 mole of isobutyllithium in 100 ml. of pentane in place of n-butyllithium in hexane.

Example 7

The experiment of Example 1 was repeated using a solution of 0.2 mole of t-butyllithium in 115 ml. of pentane in place of n-butyllithium in hexane. The reaction was run at a temperature of 15 to 30° C.

The reaction mixture was stirred at room temperature overnight.

39 grams of $(CH_3)_3SiCHCH_2C(CH_3)_3$
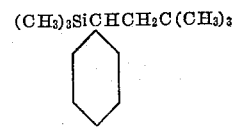

were recovered, B.P. 239° C. at 737 mm. pressure.

No t-butyltrimethylsilane was found to be present.

Example 8

When the experiment of Example 1 is repeated, replacing the reactants of that experiment with the following reactants, the following products are formed:

| Reactants | Product |
|---|---|
| (a) 1 mole ethyllithium, 4 moles diethyl-4-methylpentylbromosilane, 1 mole p-methylstyrene, 4 moles benzene. | $(CH_3)_2CH(CH_2)_3Si$—$CHCH_2CH_2CH_3$ with $C_2H_5$, $C_2H_5$ substituents on Si; phenyl ring with $CH_3$ |
| (b) 1 mole 2-ethylhexyllithium, 1 mole phenyldimethylchlorosilane, ½ mole m-butyl-m-methylstyrene, 2 moles $CH_3OCH_2CH_2OCH_3$. | phenyl-Si($CH_3$)($CH_3$)—$CHCH_2CH_2CHCH_2CH_2CH_2CH_3$ with $C_2H_5$ substituent; phenyl ring with $CH_3$ and $C_4H_9$ |
| (c) 1 mole octadecyllithium, 10 moles tripropyliodosilane, 10 moles o-hexylstyrene, 5 moles cyclopentane. | $(C_3H_7)_3SiCHCH_2(C_{18}H_{37})$; phenyl ring with $C_6H_{13}$ |

The reaction mixture was stirred for 2 hours at room temperature.

8.7 grams (0.037 mole) of $(CH_3)_3SiCHCH_2CH_2CH(CH_3)_2$
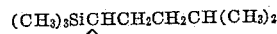

were recovered, B.P. 110–125° C. at 13 mm. pressure.

Example 6

The experiment of Example 1 was repeated, using a solution of 0.2 mole of sec-butyllithium in 87 ml. of heptane in place of n-butyllithium in hexane.

The reaction mixture was stirred overnight at room temperature.

23.9 grams (0.1 mole) of $(CH_3)_3SiCHCH_2CHCH_2CH_3$
       $|$
       $CH_3$
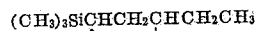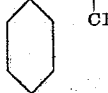

was recovered, B.P. 138–143° C. at 18–19 mm. pressure. No sec-butyltrimethylsilane was found to be present.

Example 9

A mixture of 8 grams (0.034 mole) of $(CH_3)_3SiCHCH_2C(CH_3)_3$
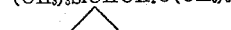

20 g. of ethanol, 5 g. of water, and 20 g. of KOH were placed in a flask equipped with a reflux condenser.

The mixture was refluxed for 64 hours. It was then cooled and added to 300 ml. of water, shaken, and extracted with ether.

The ether layer was washed with water until neutral and then dried over anhydrous sodium sulfate overnight. After filtering, the filtrate was evaporated to about 35 ml. on a Rinco stripper and distilled to yield 4.2 g. (76% yield) of $CH_2CH_2C(CH_3)_3$

B.P. 125–127° C. at 74 mm. pressure.

Example 10

When the following silanes are hydrolyzed in the manner of Example 9, the following hydrocarbons are produced:

| Silane | Hydrocarbon |
|---|---|
| (a) 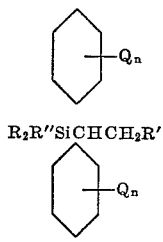 | 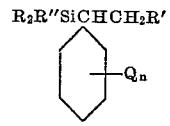 |
| (b) 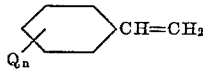 | 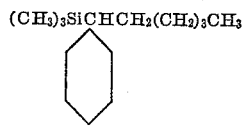 |
| (c) $(C_3H_7)_3SiCHCH_2(C_{18}H_{37})$<br>                      $C_6H_{13}$ | 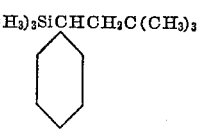 |

That which is claimed is:

1. The process of making a compound of the formula

$R_2R''SiCHCH_2R'$ comprising reacting at a temperature of −15 to +35° C., in the presence of an inert solvent which is essentially free of active hydrogen,
   (a) one molar part of a compound of the formula R'Li,
   (b) from 1 to 10 molar parts of a compound of the formula $R_2R''SiX$, and
   (c) from 0.5 to 10 molar parts of a compound of the formula $Q_n$⟨⟩$CH=CH_2$ ingredient (a) being added to the mixture last, where R is a nontertiary alkyl radical of no more than 6 carbon atoms,
R' is an alkyl radical of more than 1 carbon atom,
R'' is selected from the group consisting of nontertiary alkyl radicals of no more than 6 carbon atoms and aryl radicals,
Q is an alkyl radical of no more than 6 carbon atoms,
n is an integer of 0 to 2, and
X is a halogen atom.

2. A compound of the formula $R_2R''SiCHCH_2R'$

⟨⟩—$Q_n$ where each

R is a nontertiary alkyl radical of no more than 6 carbon atoms,
R' is an alkyl radical of more than 1 carbon atom,
R'' is selected from the group consisting of nontertiary alkyl radicals of no more than 6 carbon atoms and aryl radicals,
Q is an alkyl radical of no more than 6 carbon atoms, and
n is an integer of 0 to 2.

3.

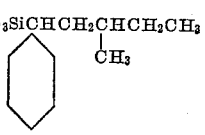

4.

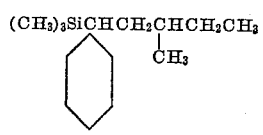

5.

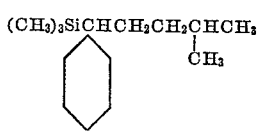

6.

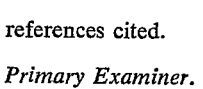

No references cited.

TOBIAS E. LEVOW, *Primary Examiner.*
J. PODGORSKI, *Assistant Examiner.*